(12) United States Patent
Senba et al.

(10) Patent No.: US 7,277,244 B2
(45) Date of Patent: Oct. 2, 2007

(54) LENS BARREL FOR IMAGE TAKING LENS

(75) Inventors: Takehiko Senba, Saitama (JP); Yukio Noguchi, Saitama (JP); Seimei Ushiro, Saitama (JP)

(73) Assignee: Fujifilm Corporation, Tokyo (JP)

( * ) Notice: Subject to any disclaimer, the term of this patent is extended or adjusted under 35 U.S.C. 154(b) by 52 days.

(21) Appl. No.: 11/452,905

(22) Filed: Jun. 15, 2006

(65) Prior Publication Data
US 2006/0285226 A1    Dec. 21, 2006

(30) Foreign Application Priority Data
Jun. 17, 2005    (JP)    ............................. 2005-178104

(51) Int. Cl.
*G02B 7/02*    (2006.01)
(52) U.S. Cl. ..................... 359/820; 361/687; 361/679; 361/688; 361/704; 361/711; 361/696; 361/697; 361/681
(58) Field of Classification Search ................ 359/820, 359/448, 542
See application file for complete search history.

(56) References Cited

U.S. PATENT DOCUMENTS

2005/0134727 A1*    6/2005    Teramoto et al. ........... 348/375
2006/0067678 A1*    3/2006    Senba et al. ................ 396/529

FOREIGN PATENT DOCUMENTS

| JP | 8-179170 A | 7/1996 |
| JP | 8-234524 A | 9/1996 |

OTHER PUBLICATIONS

The Furukawa Electric Co., LTD Product catalog with aplication illustration published on internet at web site: http://www.furukawa.co.jp/english/index.htm.*

* cited by examiner

*Primary Examiner*—David Bruce
*Assistant Examiner*—Vipin M. Patel
(74) *Attorney, Agent, or Firm*—Sughrue Mion, PLLC

(57) ABSTRACT

A heat sink is attached to a subject-side end portion of a barrel body of a lens barrel. The heat sink is provided with a large number of radiation fins formed in whorl. A heat pipe is disposed between the heat sink and a mount-side end portion of the barrel body. A CCD is fixed to the mount-side end portion of the barrel body. Heat of the CCD is transferred to the heat pipe via the mount-side end portion. Successively, the heat is efficiently transferred to the heat sink by the heat pipe. The heat having been transferred to the heat sink is efficiently radiated into the air by the whorl-like radiation fins regardless of conditions of the lens barrel.

15 Claims, 6 Drawing Sheets

LENS BARREL FOR IMAGE TAKING LENS

FIELD OF THE INVENTION

The present invention relates to a lens barrel, and in particular relates to a lens barrel for an image taking lens attached to a shooting device of an electronics camera and so forth.

BACKGROUND OF THE INVENTION

There is a well-known lens barrel for an image taking lens attached to a shooting device of an electronics camera and so forth. By the way, with respect to a solid-state imaging device (CCD and so forth) and a CPU built in the shooting device, heating value thereof increases as its performance is advanced. Due to this, harmful effects are sometimes caused. For example, operation becomes unstable, a processing speed lowers, and life is shortened. Consequently, it is necessary to prevent temperature rise by efficiently radiating the heat of the solid-state imaging device and so forth.

It is considered that the lens barrel has a radiation effect to radiate the heat of the solid-state imaging device and so forth. For instance, in a known semiconductor laser module used for optical communication, the inside thereof is provided with a heat sink to radiate the heat emitted from the semiconductor laser (see Japanese Patent Laid-Open Publication No. 8-179170). Meanwhile, a known color-image forming device has an electric heater, a cooling pipe and a propeller fan for the purpose of keeping an image-forming optical system in a proper temperature (see Japanese Patent Laid-Open Publication No. 8-234524).

The semiconductor laser module described in the above-noted Publication No. 8-179170 contains the heat sink. However, it is impossible to dispose a heat sink inside the lens barrel of the taking lens, since the lens barrel becomes large. In the color-image forming device described in the above-noted Publication No. 8-234524, the copling pipe is drawn out of a support member of the optical system, and the propeller fan is used. Thus, it is impossible to adopt this manner to the lens barrel of the taking lens.

SUMMARY OF THE INVENTION

In view of the foregoing, it is a primary object of the present invention to provide a lens barrel for an image taking lens in which radiation effect is improved.

In order to achieve the above and other objects, the lens barrel according to the present invention comprises a barrel body, a heat radiating member, and a heat pipe. The barrel body is attached to a camera body and contains an optical lens system. The heat radiating member is disposed at a subject side of the barrel body and is excellent at radiation effect in comparison with the barrel body. The heat pipe is contained in the barrel body to transfer heat, which is generated by an imaging device disposed in either of the barrel body and the camera body, to the heat radiating member.

In a preferred embodiment, a guide shaft for guiding a lens holder holding a lens of the optical lens system is composed of the heat pipe. The lens holder is guided and moved in an optical-axis direction of the optical lens system. Moreover, the heat radiating member is a heat sink having a plurality of radiation fins. In another embodiment, the heat radiating member is a metal lens hood having a plurality of radiation fins.

According to the lens barrel of the present invention, the heat radiating member disposed at the subject side of the barrel body has higher radiation effect in comparison with the barrel body. In addition, the heat pipe is contained in the barrel body to transfer the heat, which is generated by the imaging device, to the heat radiating member. Thus, the radiation effect of the lens barrel is improved. When the guide shaft for guiding the lens holder is utilized as the heat pipe, it is unnecessary to add the heat pipe as a separate member so that there are advantages regarding attachment space and cost. When the heat radiating member is the heat sink, the heat is efficiently radiated. When the heat radiating member is the metal lens hood, it is unnecessary to add a new separate member as the heat radiating member so that the radiation effect is inexpensively improved.

DESCRIPTION OF THE PREFERRED EMBODIMENTS

Figure 1:
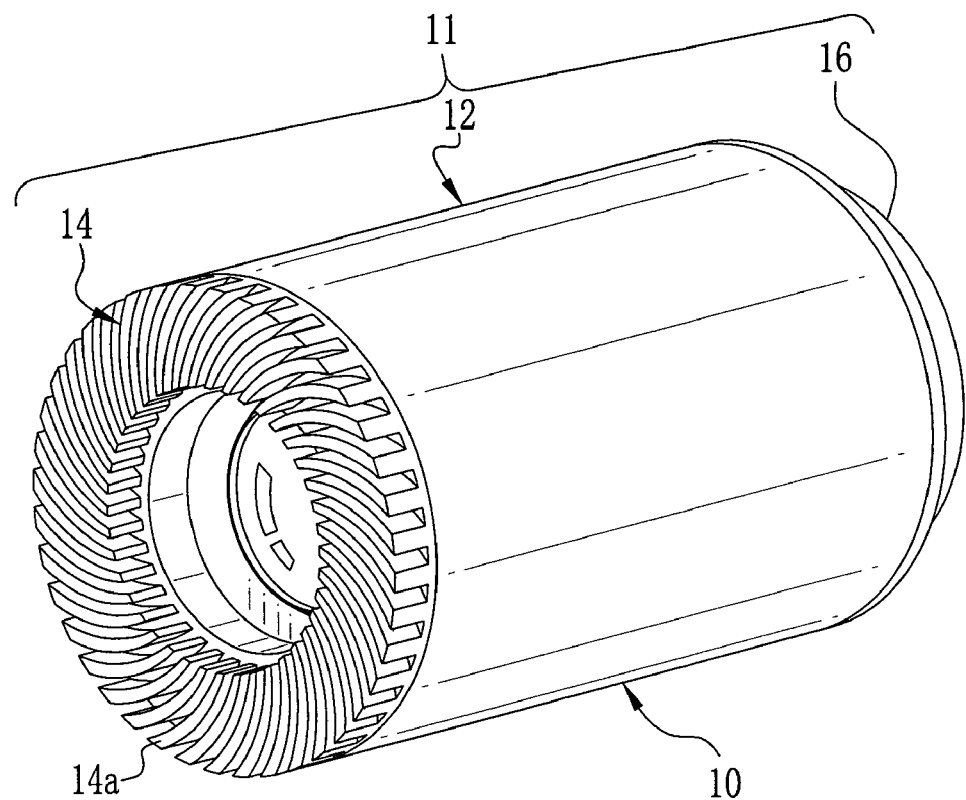
FIG. 1 is a perspective view showing a lens barrel of a first embodiment of the present invention.

FIG. 1 shows an appearance of a lens barrel according to a first embodiment of the present invention. In FIG. 1, the lens barrel 11 for a taking lens 10 comprises a cylindrical barrel body 12, a heat sink 14 fixed to a subject-side end of the barrel body 12, and a mount portion 16 to be attached to a lens mount of a camera body of an electronic camera not shown.

The barrel body 12 is made of a metal having relatively high thermal conductivity. For instance, the barrel body 12 is made of aluminum alloy. The heat sink 14 is made of a metal having higher radiation effect in comparison with the barrel body 12. For instance, the heat sink 14 is made of copper and is formed so as to have a large number of radiation fins 14a arranged in whorl. In virtue of the whorl-like fins 14a, radiation effect is stably obtained regardless of positions of the taking lens 10.

Figure 2:
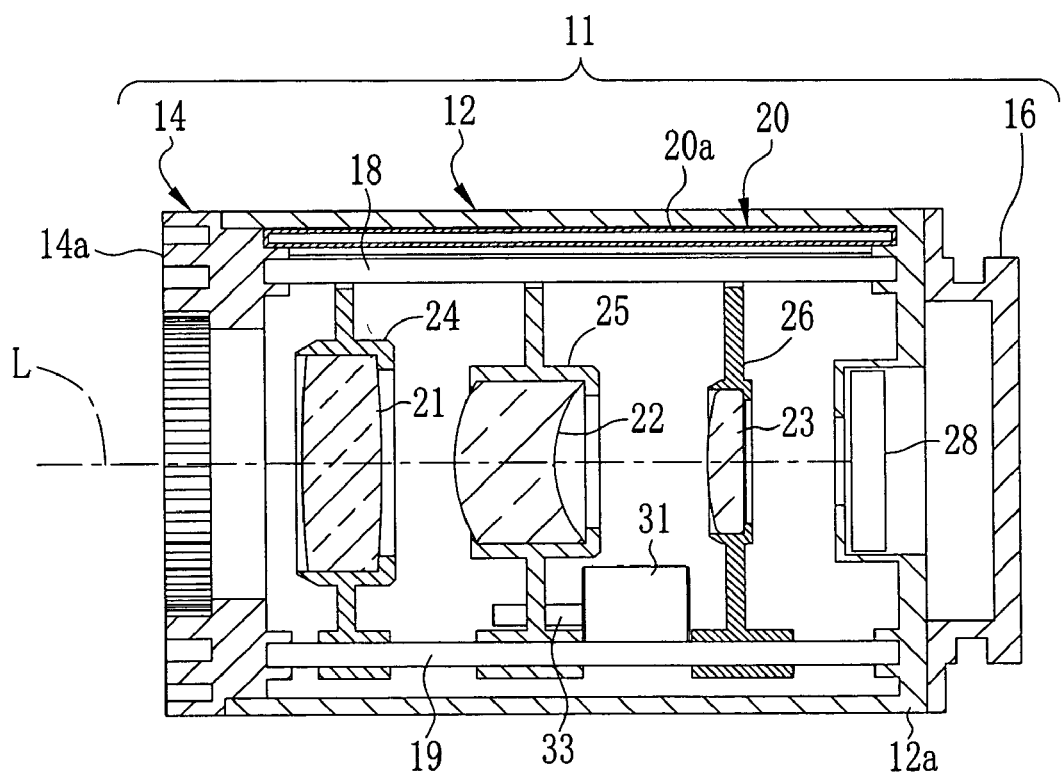
FIG. 2 is a longitudinal sectional view showing an internal structure of the first embodiment.
Figure 3:
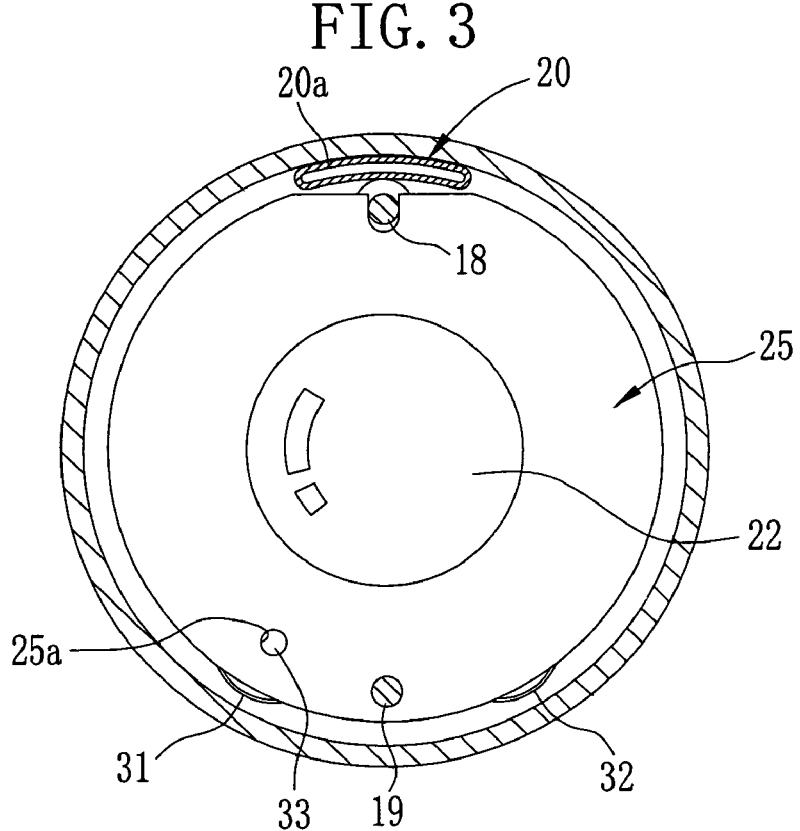
FIG. 3 is a transverse sectional view showing the internal structure of the first embodiment.

In FIGS. 2 and 3 respectively showing a longitudinal section and a transverse section of the lens barrel 11, two guide shafts 18 and 19 having a round-bar shape are disposed between the heat sink 14 and an end portion 12a of the barrel body 12, which is located at a side of the mount portion 16. Moreover, a heat pipe 20 is also disposed between the heat sink 14 and the end portion 12a. Incidentally, the longitudinal section of the lens barrel 11 means the plane thereof sectioned in a direction of a shooting optical axis L. The transverse section of the lens barrel 11 means the plane thereof sectioned in a direction perpendicular to the shooting optical axis L.

Lens holders 24 to 26 of first to third lenses 21 to 23 are attached to the guide shafts 18 and 19 so as to be movable in the direction of the shooting optical axis L. Further, a CCD 28, or a solid-state imaging device is attached to the end portion 12a located behind the third lens 23.

With respect to the heat pipe 20, a refrigerant (liquid) is contained in a metal tube as is well known, and heat transfer is performed by utilizing latent heat of evaporation and condensation of the liquid. In this embodiment, the refrigerant is contained in a copper container 20a having a thickness of 2 mm and a rectangular shape. The heat pipe 20 is larger than a normal heat pipe of a round-bar shape so as to have higher heat transfer effect in comparison therewith. However, the container 20a is curved in an arc shape along an inner wall of the barrel body 12 and is disposed in a dead space which is a gap formed between the guide shaft 18 and the inner wall of the barrel body 12. Thus, space saving properties are secured.

Two drive motors 31 and 32 are disposed between the second lens 22 and the third lens 23. A worm gear 33 fixed to a shaft of the drive motor 31 meshes with a circular opening 25a formed in the lens holder 25 of the second lens 22. Upon rotation of the worm gear 33, the lens holder 25 moves in the direction of the shooting optical axis L to perform zooming of the taking lens 10. Similarly, the drive motor 32 moves the lens holder 26 of the third lens 23 to perform focusing of the taking lens 10.

An operation of the lens barrel 11 having the above structure is described below. After the taking lens 10 has been attached to the camera body not shown, the CCD 28 is activated and generates heat. The generated heat is transferred to the heat pipe 20 via the end portion 12a of the barrel body 12. The heat pipe 20 efficiently transfers the heat to the heat sink 14. By means of the whorl-like radiation fins 14a, the heat having been transferred to the heat sink 14 is efficiently radiated into the air regardless of the condition of the taking lens 10. As a result, temperature of the CCD 28 is prevented from excessively increasing so that the CCD 28 is stably operated at any time and the life thereof may be elongated.

Figure 4:
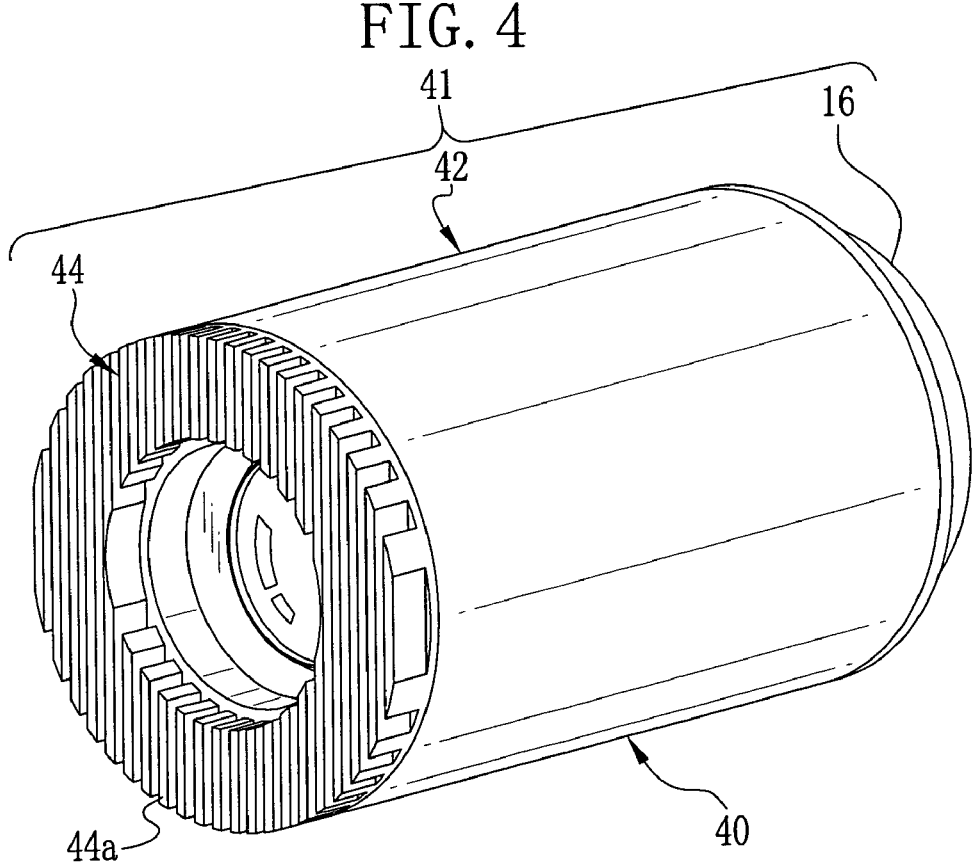
FIG. 4 is a perspective view showing a lens barrel of a second embodiment of the present invention.

FIG. 4 shows an appearance of a lens barrel according to a second embodiment of the present invention. In FIG. 4, the lens barrel 41 for a taking lens 40 comprises a cylindrical barrel body 42, a copper heat sink 44 fixed to a subject-side end of the barrel body 42, and the mount portion 16.

The heat sink 44 comprises a large number of radiation fins 44a which have a linear shape and are parallel to each other. When the lens barrel 41 is attached to the camera body, the radiation fin 44a extends in a vertical direction such as shown in FIG. 4 so that the heat is easily radiated in an upward direction. In this embodiment, a component identical with that of the first embodiment is denoted by the same reference numeral, and description thereof is omitted.

Figure 5:
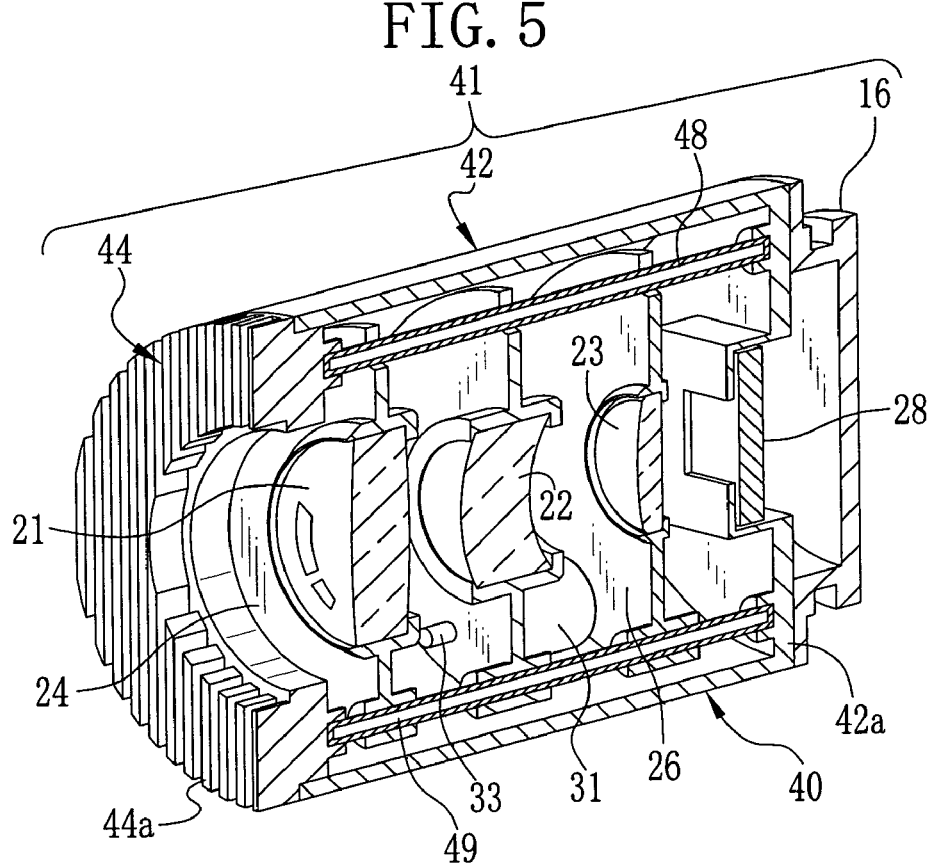
FIG. 5 is a perspective view of a longitudinal section showing an internal structure of the second embodiment.
Figure 6:
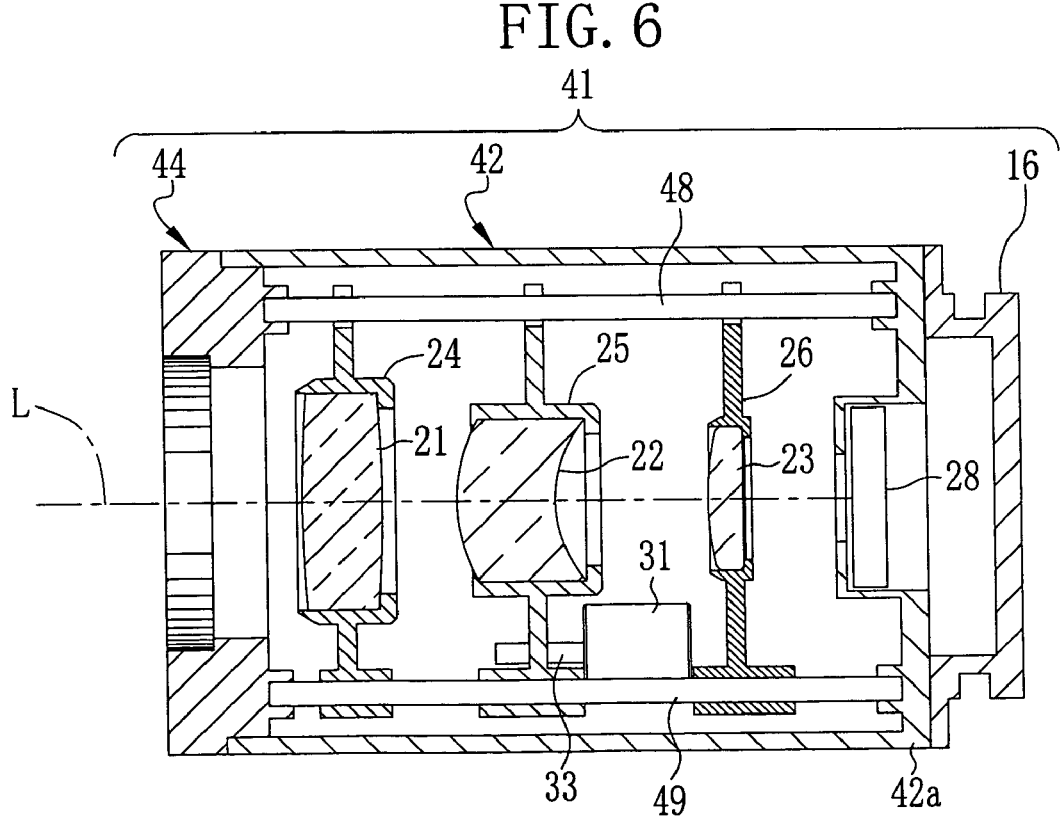
FIG. 6 is a longitudinal sectional view showing the internal structure of the second embodiment.

As shown in FIGS. 5 and 6, two guide shafts 48 and 49 are disposed between the heat sink 44 and an end portion 42a of the barrel body 42 to movably support the lenses 21 to 23 in the direction of the shooting optical axis L. The guide shafts 48 and 49 are well-known heat pipes having a round-bar shape. The guide shafts 48 and 49 transfer the heat of the CCD 28, which is transmitted via the end portion 42a, to the heat sink 44.

An operation of the lens barrel 41 having the above structure is described below. The heat generated from the CCD 28 is transferred to the guide shafts 48 and 49 via the end portion 42a of the barrel body 42, and then is efficiently transferred to the heat sink 44 by the guide shafts 48 and 49, or the heat pipes. The heat having been transferred to the heat sink 44 is efficiently radiated into the air by the radiation fins 44a. As a result, temperature of the CCD 28 is prevented from excessively increasing so that the CCD 28 is stably operated at any time.

In this embodiment, the two guide shafts are also used as the heat pipes. Thus, it is unnecessary to provide the heat pipe as a separate member so that it is possible to prevent a number of parts and cost from increasing.

Figure 7:
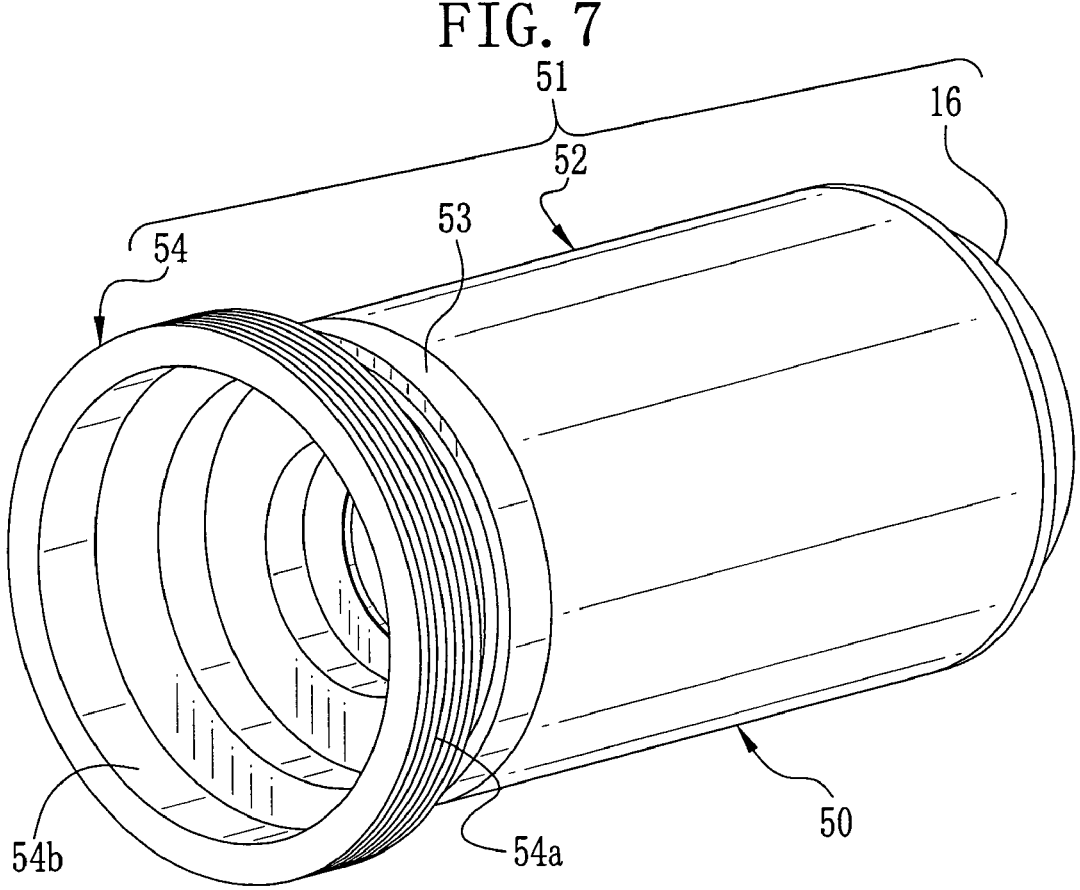
FIG. 7 is a perspective view showing a lens barrel of a third embodiment of the present invention.
Figure 8:
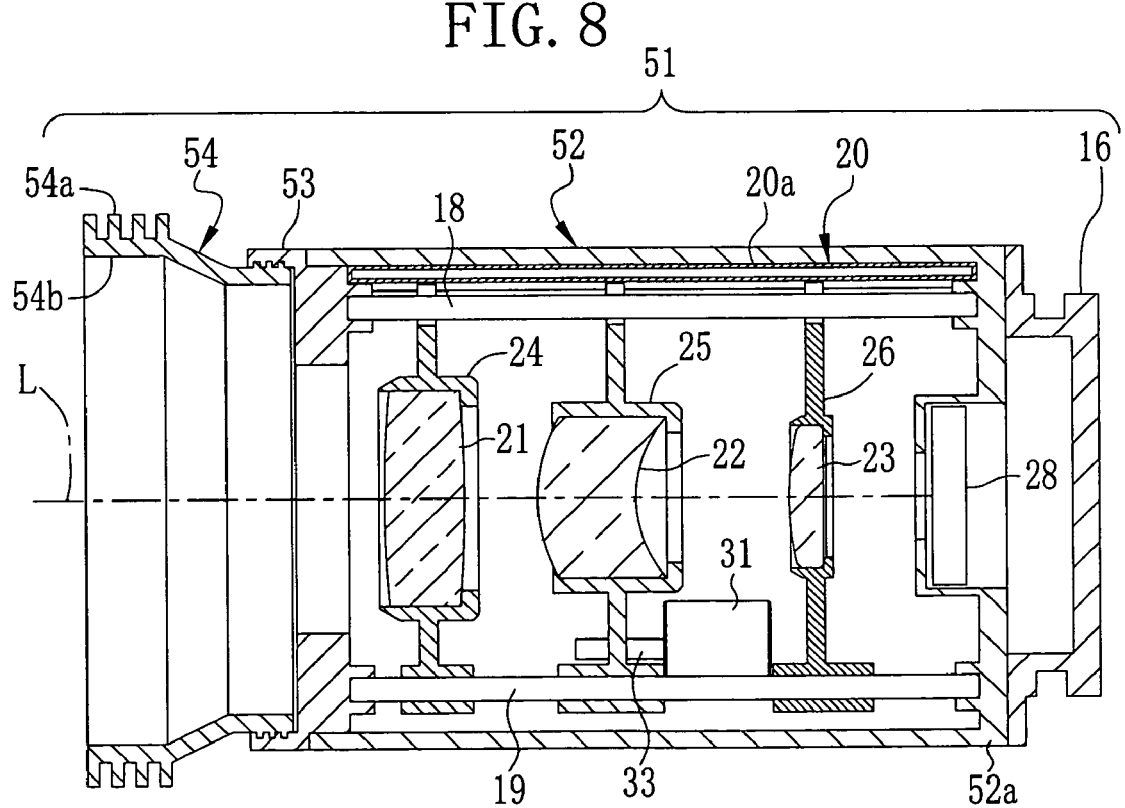
FIG. 8 is a longitudinal sectional view showing an internal structure of the third embodiment.

In FIGS. 7 and 8 showing a third embodiment of the present invention, a lens barrel 51 for a taking lens 50 comprises a cylindrical barrel body 52, a decorative ring 53, a lens hood 54 and the mount portion 16. The decorative ring 53 is fixed to a subject-side end of the barrel body 52. The lens hood 54 is detachably engaged with the decorative ring 53 in a screw manner to prevent harmful rays from entering the first lens 21. By the way, a component identical with that of the first embodiment is denoted by the same reference numeral, and description thereof is omitted.

The lens hood 54 also has a function of the heat sink. In consideration of this, the lens hood 54 is made of a metal having high radiation performance. For example, the lens hood 54 is made of copper. An outer circumference of the lens hood 54 is provided with four radiation fins 54a having a ring shape. The radiation fins 54a are arranged in the optical axis L so as to be parallel to each other. The radiation fins 54a are arranged on the outer circumference of a large diameter portion 54b, which is a part of the lens hood 54 and has the largest diameter. Thus, it is possible to secure a sufficiently broad surface area and to obtain excellent radiation effect. Incidentally, it is needless to say that the number of the radiation fins 54a is not limited to four.

Between the decorative ring 53 and an end portion 52a of the barrel body 52, which is located at a side of the mount portion 16, the heat pipe 20 and the pair of the guide shafts 18 and 19 are disposed similarly to the first embodiment. Instead of the guide shafts 18 and 19, the guide shafts 48 and 49 of the heat pipe may be used. The barrel body 52 and the decorative ring 53 are made of a metal having excellent thermal conductivity, for example aluminum alloy. Incidentally, the decorative ring 53 may be made of copper.

An operation of the lens barrel 51 having the above structure is described below. The heat generated from the CCD 28 is transferred to the heat pipe 20 via the end portion 52a of the barrel body 52. The heat pipe 20 efficiently transfers the heat to the decorative ring 53. And then, the heat is transferred to the lens hood 54. The heat having been transferred to the lens hood 54 is efficiently radiated into the air by the large radiation fins 54a having the ring shape. As a result, temperature of the CCD 28 is prevented from excessively increasing so that the CCD 28 is stably operated at any time.

Figure 9:
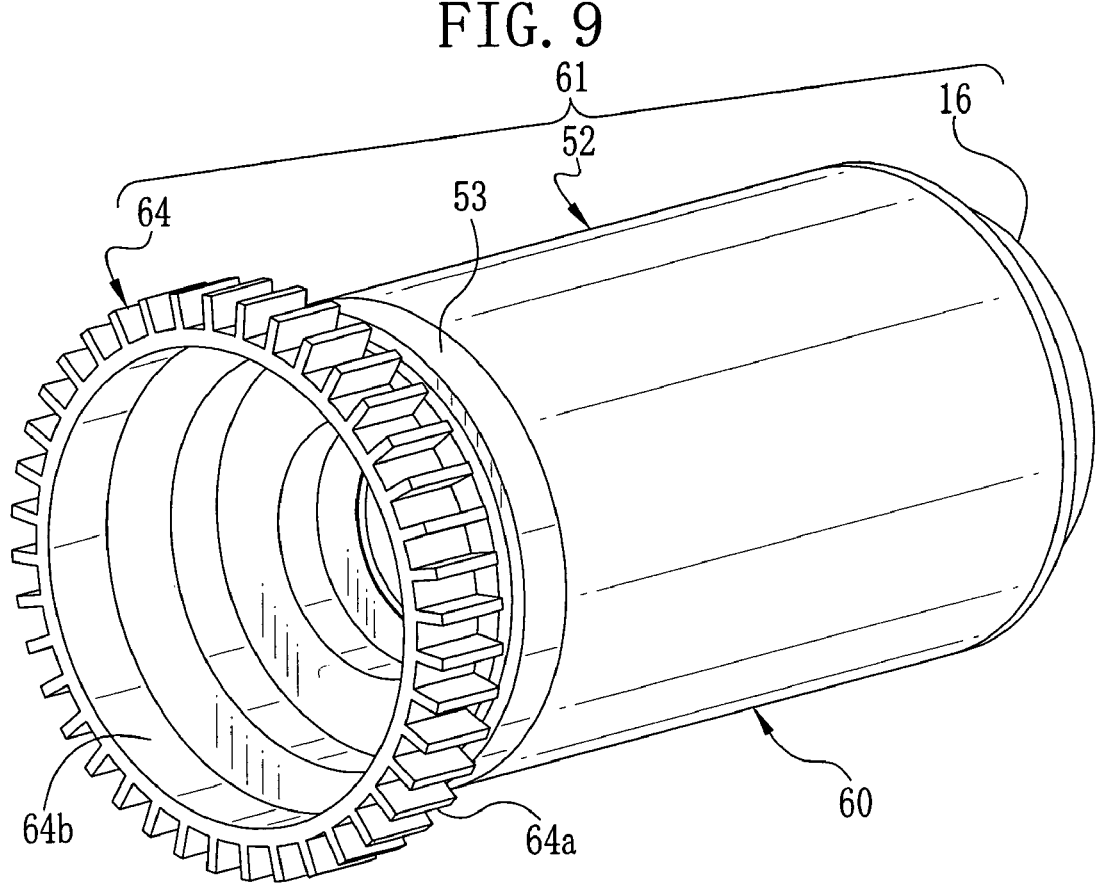
FIG. 9 is a perspective view showing a lens barrel of a fourth embodiment of the present invention.
Figure 10:
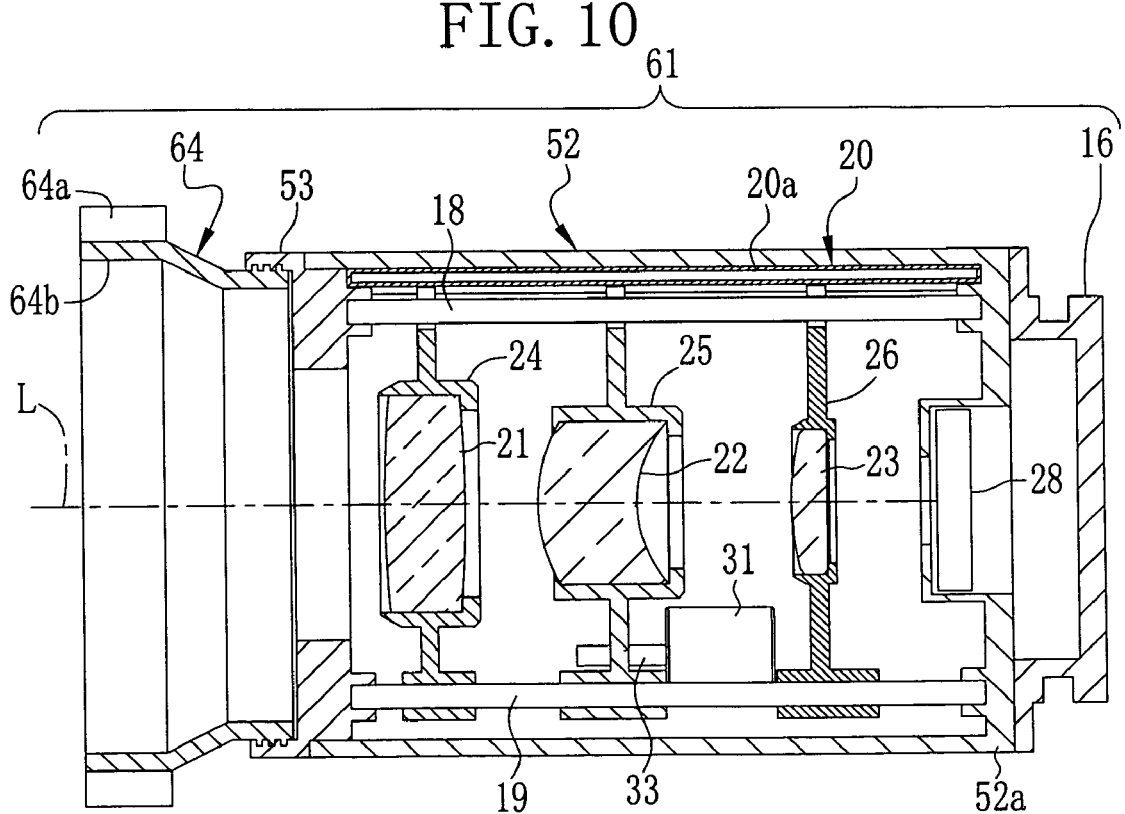
FIG. 10 is a longitudinal sectional view showing an internal structure of the fourth embodiment.

In FIGS. 9 and 10 showing a fourth embodiment of the present invention, a lens barrel 61 for the taking lens 60 employs another lens hood 64 instead of the lens hood 54 of the third embodiment. The lens hood 64 is provided with radiation fins 64a, a shape of which is different from the third embodiment. Incidentally, a component identical with that of the third embodiment is denoted by the same reference numeral and description thereof is omitted.

The radiation fins 64a of the lens hood 64 respectively have a rectangular shape and are radially and equiangularly arranged on an outer circumference of a large diameter portion 64b, which is a part of the lens hood 64 and has the largest diameter. Although a surface area of each radiation fin 64a is small, the total surface area becomes large. Thus, excellent radiation effect is obtainable.

Figure 11:
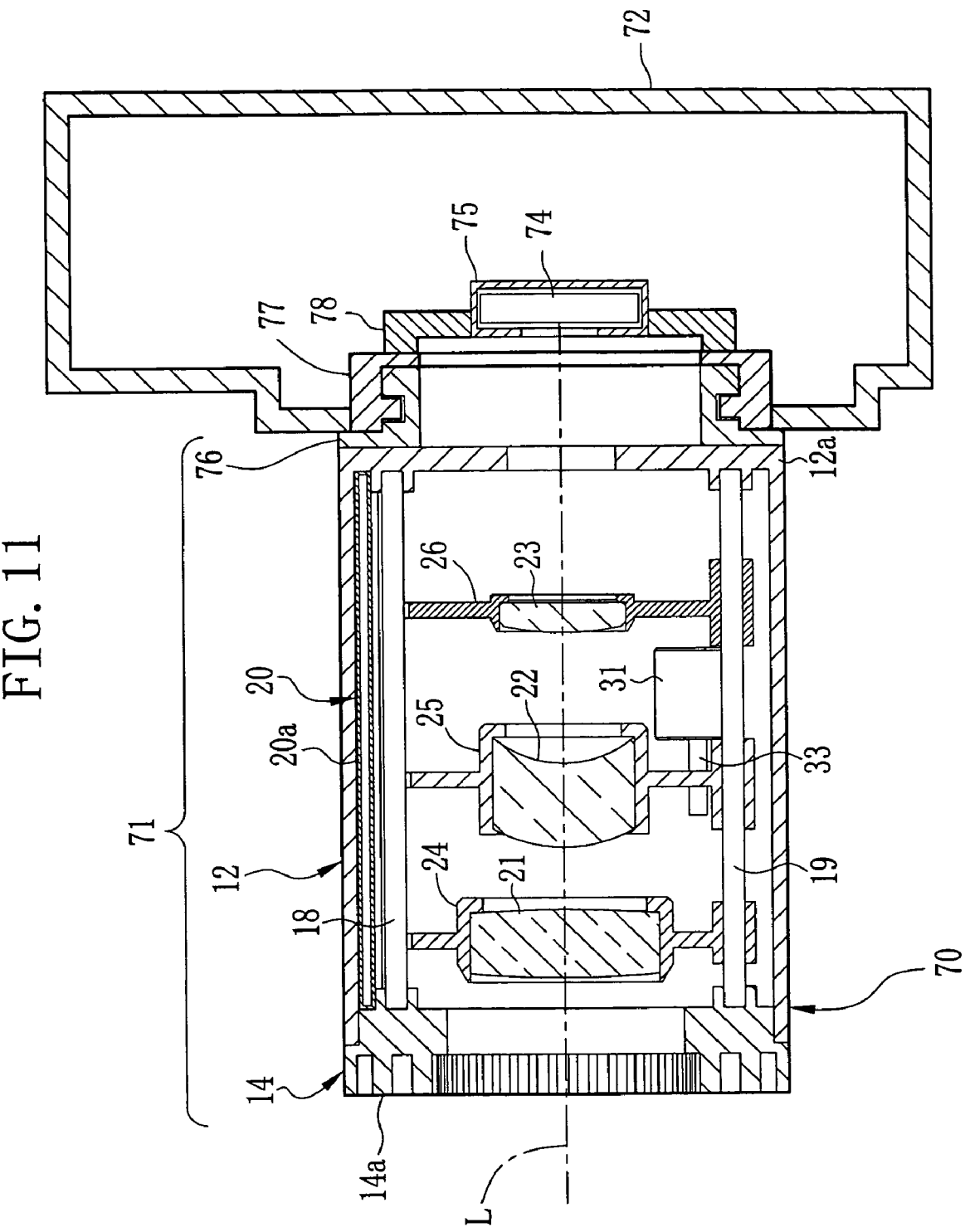
FIG. 11 is a longitudinal sectional view showing an internal structure of a fifth embodiment.

Next, a fifth embodiment of the present invention is described below with reference to FIG. 11. Incidentally, a component identical with that of the first embodiment is denoted by the same reference numeral and description thereof is omitted. A lens barrel 71 for a taking lens 70 does not contain a CCD. The lens barrel 71 transfers and radiates the heat of a CCD 74 built in a camera body 72 to which the taking lens 70 is attached. The CCD 74 is held by a CCD retainer 75 made of metal. Between the CCD retainer 75 and a lens mount 77 to which a mount portion 76 of the taking lens 70 is attached, a heat transfer ring 78 is disposed. The heat transfer ring 78 is made of a metal having high thermal conductivity, for example is made of copper.

When the CCD 74 is activated, the heat thereof is transferred to the mount portion 76 via the CCD retainer 75, the heat transfer ring 78 and the lens mount 77. Further, the heat is transferred to the heat pipe 20 via the end portion 12a of the barrel body 12. And then, the heat is efficiently transferred to the heat sink 14. The heat having been transferred to the heat sink 14 is efficiently radiated into the air by the whorl-like radiation fins 14a. Incidentally, if a similar heat transfer passage is provided between the lens mount 77 and a CPU built in the camera body 72, heat of the CPU may be also radiated by the lens barrel 71.

In the foregoing first embodiment, the thickness of the heat pipe is 2 mm. However, it is needless to say that the present invention is not limited to this thickness. Moreover, in the first embodiment, the heat pipe has the rectangular shape. The present invention, however, is not limited to this shape. Well-known heat pips having a round-bar shape may be used in a condition that the heat pips are arranged side-by-side.

In the foregoing first and second embodiments, the heat sink is fixed to the subject-side end portion of the lens barrel. However, the heat sink may be detachably attached. Moreover, although the heat sink is positioned at the subject-side end portion of the lens barrel, the present invention is not limited to this. For example, the heat sink may be positioned at a part of the subject-side outer circumference of the lens barrel. In this case, the radiation fin of the heat sink may be formed in a ring shape, a linear shape parallel to the shooting optical axis L, and so forth.

In the foregoing third and fourth embodiments, the heat pipe identical with the first embodiment is used for transferring the heat of the CCD from the CCD-side end portion of the barrel body to the decorative ring. However, the guide shaft may be used as the heat pipe similarly to the second embodiment. Moreover, in the third and fourth embodiments, the lens hood is provided with the radiation fins. The present invention, however, is not limited to this. The radiation fins may be removed, although radiation effect is considerably lowered.

In the above embodiments, as the metal having the excellent radiation effect, the copper and the aluminum alloy are utilized for forming the heat sink and the lens hood. The present invention, however, is not limited to these metals. Other metals having radiation effect may be utilized. In the above embodiments, the CCD is employed as the solid-state imaging device. The present invention, however, is not limited to the CCD. An image sensor of CMOS type may be employed.

The above embodiments relate to the taking lens of the electronic camera for capturing a still image. The present invention, however, may be adopted to a taking lens of a movie camera for capturing a moving image.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens barrel for an optical lens system comprising:
   a barrel body for containing said optical lens system;
   a heat radiating member disposed at a subject side of said barrel body, said heat radiating member having higher radiation effect in comparison with said barrel body; and
   a heat pipe contained in said barrel body, said heat pipe transferring heat, which is generated by an imaging device disposed in either of said barrel body and a camera body to which said barrel body is attached, to said heat radiating member.

2. The lens barrel according to claim 1, further comprising a lens holder for holding a lens of said optical lens system, and a guide shaft for movably guiding said lens holder in an optical-axis direction of said optical lens system, said guide shaft being composed of said heat pipe.

3. The lens barrel according to claim 1, wherein said heat radiating member is a heat sink having a plurality of radiation fins.

4. The lens barrel according to claim 3, wherein said heat sink is made of copper.

5. The lens barrel according to claim 3, wherein said radiation fins are arranged in whorl.

6. The lens barrel according to claim 3, wherein said radiation fins have a linear shape and are arranged in parallel with each other.

7. The lens barrel according to claim 6, wherein said radiation fins are adapted to extend in a vertical direction when said barrel body is attached to said camera body, so that said heat is radiated in an upward direction.

8. The lens barrel according to claim 1, wherein said heat radiating member is a lens hood for preventing harmful rays from entering said optical lens system, said lens hood being made of a metal and having a plurality of radiation fins.

9. The lens barrel according to claim 8, wherein said lens hood has a cylindrical shape, and said radiation fins are disposed on an outer circumference of said lens hood.

10. The lens barrel according to claim 9, wherein said lens hood comprises a plurality of cylindrical portions having different diameters, and said radiation fins are disposed on the outer circumference of said cylindrical portion having the largest diameter.

11. The lens barrel according to claim 10, wherein said radiation fins have a ring shape and are arranged in an optical-axis direction of said optical lens system so as to be parallel with each other.

12. The lens barrel according to claim 10, wherein said radiation fins have a rectangular shape, and are equiangularly and radially arranged.

13. The lens barrel according to claim 8, wherein said lens hood is made of copper.

14. The lens barrel according to claim 8, further comprising:
   a decorative ring fixed to a subject-side end portion of said barrel body, said lens hood being detachably attached to said decorative ring in a screw manner.

15. The lens barrel according to claim 14, wherein said decorative ring is made of aluminum alloy.

* * * * *